No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 4.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 5.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 6.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 7.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 9.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 10.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 11.

No. 637,182. Patented Nov. 14, 1899.
J. & J. R. TEMPERLEY.
APPARATUS FOR DUMPING, DEPOSITING, OR RELEASING LOADS SUSPENDED FROM CRANES, &c.
(Application filed June 28, 1898.)
(No Model.) 13 Sheets—Sheet 12.

UNITED STATES PATENT OFFICE.

JOSEPH TEMPERLEY AND JOHN RIDLEY TEMPERLEY, OF LONDON, ENGLAND.

APPARATUS FOR DUMPING, DEPOSITING, OR RELEASING LOADS SUSPENDED FROM CRANES, &c.

SPECIFICATION forming part of Letters Patent No. 637,182, dated November 14, 1899.

Application filed June 28, 1898. Serial No. 684,691. (No model.)

*To all whom it may concern:*

Be it known that we, JOSEPH TEMPERLEY and JOHN RIDLEY TEMPERLEY, engineers, subjects of the Queen of Great Britain, residing at 72 Bishopsgate street, London, England, have invented certain new and useful Improvements in Apparatus for Dumping, Depositing, or Releasing Loads Suspended from Cranes, Transporters, and other Hoisting-Machines, of which the following is a specification, reference being had to the accompanying drawings, in which—

Figs. 20 and 21 are side elevations, and Fig. 22 a sectional side elevation, illustrating further modifications of our said invention. Fig. 23 is a side elevation, partly in vertical section, and Fig. 24 is a front elevation, partly in section, on the line $x^3\ x^3$, Fig. 23, showing another arrangement for releasing the bucket.

Our invention relates to improved apparatus for dumping, depositing, or releasing loads lifted by cranes, transporters, and other kinds of hoisting or conveying machines.

The chief object of our invention is to provide improved means whereby the emptying of a bucket or grab or the releasing of a load suspended from a crane, transporter, or other hoisting-machine can be effected by means of the rope or chain used for raising and lowering the load. Heretofore in some forms of apparatus used for this purpose it has been necessary to employ a supplementary or auxiliary operating rope or chain for releasing or dumping the load. In other forms of such apparatus a device is employed which will operate to release or dump the load when it has been lowered to a predetermined position; but in such cases the load cannot be released or dumped either above or below such predetermined position. With all of these forms of apparatus either the ground or an attachment to the track must be used as a fulcrum to perform the operation of releasing or dumping the load.

Now by our invention, without employing an auxiliary rope or chain and with only the suspended load as a fulcrum, we provide for the releasing or dumping of the load at whatever height the load may be from the ground or other surface upon which it is to be deposited and without such height being predetermined. With our apparatus, moreover, a load can be raised and then lowered to any position that may be determined by the operator and the load then dumped without the bucket coming in contact with the ground. Our invention will therefore save the breakage of coal, as the bucket can be lowered to within a foot of the ground of the heap and then dumped, thus also avoiding the damage and inconvenience arising from the buckets being allowed to rest upon the heap before dumping.

Our said invention partly consists in load releasing or tipping mechanism for hoisting or conveying apparatus, which is adapted to be operated by alternation of the paying out and hauling in of the lifting rope or chain in any and every position to which the load can be raised, lowered, or transported. This mechanism is preferably constructed with a reversible pawl or pawls arranged to be cocked by the movement of the lifting rope or chain in one direction, so that the said mechanism can then be operated by a reversal of the movement of said rope or chain.

Our said invention also partly consists in a hoisting or conveying apparatus comprising members suspended from the lifting rope or chain and one of which is movable relatively to the other by both the paying out and hauling in of said rope or chain, and means to release or dump the load, said means being carried by one of said members and actuated by the relative movement of the other of said members, whereby the load can be dumped at any and every position to which it can be raised and lowered or transported.

Our said invention also partly consists in the combination, with the lifting rope or chain, of members suspended from said rope or chain and one of which is movable relatively to the other by both the paying out and hauling in of said rope or chain, and a load-releaser adapted to bring about the dumping of the load, which load-releaser is carried by one of said members and is first set or adjusted by relative movement of the other of said members in one direction and then actuated by relative movement of said member in the reverse direction to bring about the release or dumping of the load.

Our said invention also partly consists in the combination of hoisting or lifting tackle comprising a lifting rope or chain and members suspended therefrom, one of which is movable relatively to the other by both the paying out and hauling in of said rope or chain, means to keep the load suspended from said rope or chain, a load-releaser carried by one of said members and adapted to bring about the dumping of the load, a projection or shoulder on the other of said members adapted in the paying out and hauling in of said rope or chain to first set or adjust said load-releaser and then actuate the same, and a pivoted lever whereby said load-releaser is thrown out of gear after the load is dumped or released.

Our said invention also partly consists in an apparatus for dumping or releasing loads suspended from a lifting-rope and comprising a retaining device suspended from said lifting-rope for temporarily preventing the dumping or release of the suspended load, a movable pawl-carrier having a reversible pawl and adapted when moved in one direction to disengage said retaining device, a support for said pawl-carrier suspended from said lifting-rope, and a shouldered member also suspended from said lifting-rope, whereby in the paying out and hauling in of said lifting-rope said reversible pawl is first cocked and said pawl-carrier then moved through the medium of the said reversible pawl to bring about the dumping or release of the suspended load.

Our said invention also partly consists in the combination, with a lifting or hoisting tackle, of a frame suspended from the lifting-rope, a pawl-carrier with a reversible pawl mounted in said frame, a load-releasing cord or chain connected with said pawl-carrier, and a shouldered member also suspended from said lifting-rope and movable relatively to said frame, whereby in the paying out and hauling in of said lifting-rope said reversible pawl is first cocked and said pawl-carrier then actuated through the medium of the said reversible pawl to haul in said releasing-cord or chain, and thus bring about the dumping or release of the load.

Our said invention further partly consists in the combination, with a lifting or hoisting tackle, of load releasing or tipping mechanism suspended from the lifting rope or chain of such tackle, an operating device therefor also suspended from said lifting rope or chain, and a lever or other shifting device whereby said mechanism is thrown out of gear after the dumping or release of the load and will be automatically thrown into gear when a fresh load is lifted or transported to a predetermined position, so that the load can be released or dumped in that position or after being raised, lowered, or transported to any other position. This arrangement affords an extra safeguard in the use of the apparatus and is very advantageous. It is, however, not absolutely necessary and can be dispensed with, if so desired, and our said invention further consists in the combination, construction, and arrangement of the load releasing or tipping mechanism, as hereinafter more particularly described, and set forth in the claims.

In Figs. 1 to 8 we have shown our improvements applied to a traveler A, adapted to be moved along an overhead track B by means of the lifting-rope D, a bucket F being suspended from the fall-block $f$ of the said traveler by means of a bridle or bail F'. A pawl-carrier G is adapted to slide to and fro in a guideway or race $f^2$ in the frame $f$ of the fall-block beneath the sheave H. This pawl-carrier is connected at one end by means of a cord or chain G' passing over guide-pulleys F$^2$ to a latch J, suitably arranged in the bail F' of the bucket F, so that when the chain G' is pulled upward the said latch will be disengaged from the bucket F, as hereinafter described.

A pawl or pair of pawls K is mounted on a pivot-pin K' in the carrier G. These pawls are adapted to engage with cocking-shoulders H$^2$ and operating-shoulders H³ at opposite ends of recesses H' in the sheave H, which recesses are deeper at the end H² than at the other end H³, as shown.

Figure 1:
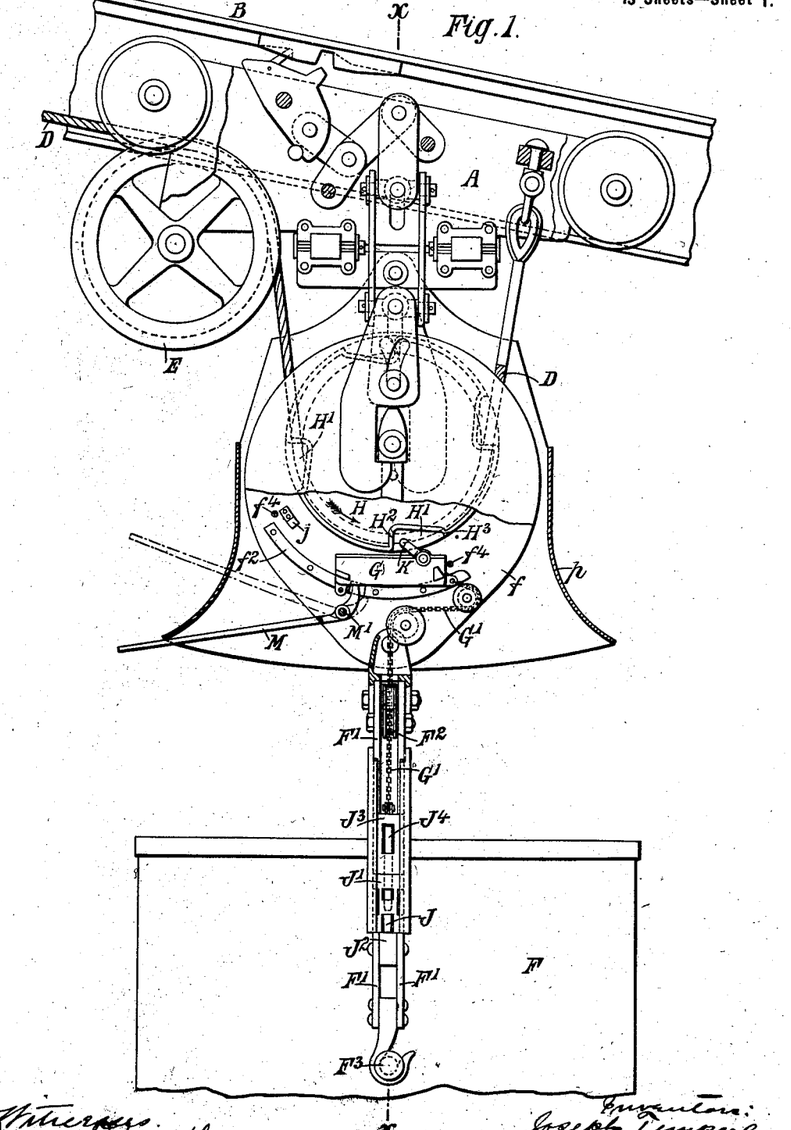
Figure 1 is a side elevation, partly in vertical longitudinal section, showing one form of our improved apparatus applied to the traveler of a transporter.
Figures 2, 8:
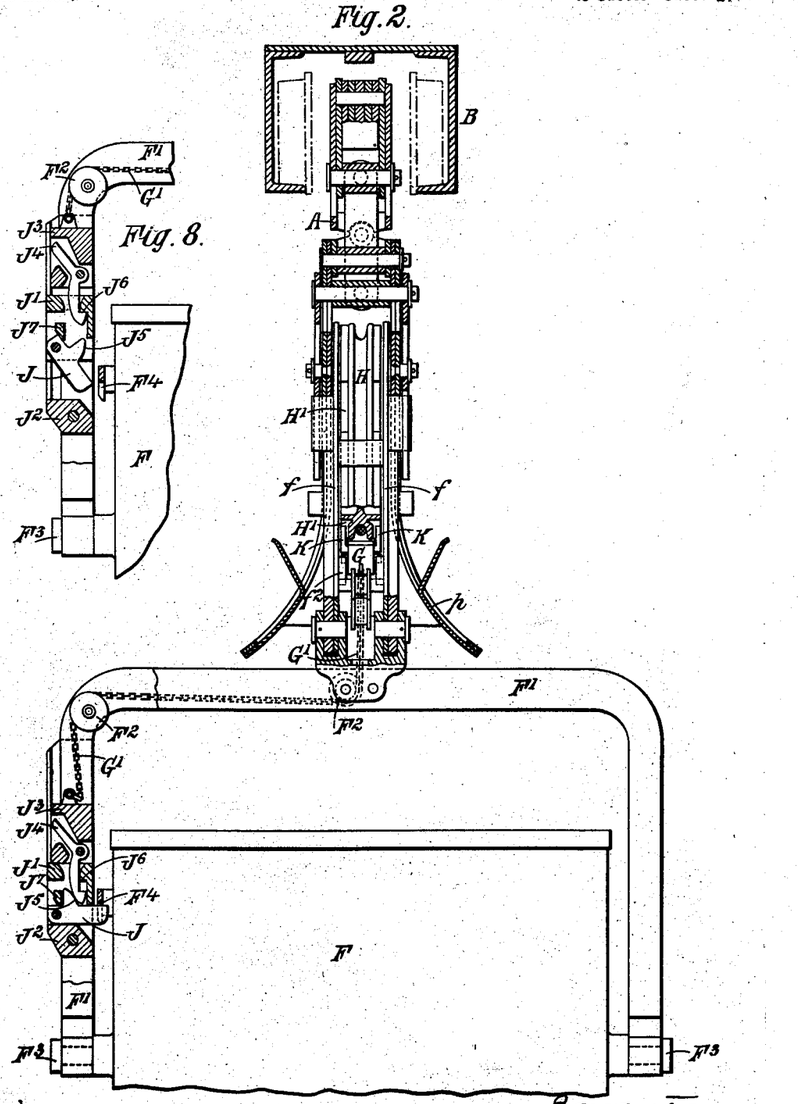
Fig. 2 is an end elevation, partly in vertical section, on the line $x\ x$, Fig. 1.
Fig. 8 shows a portion of Fig. 2 with some of the moving parts in a different position.
Figure 3:
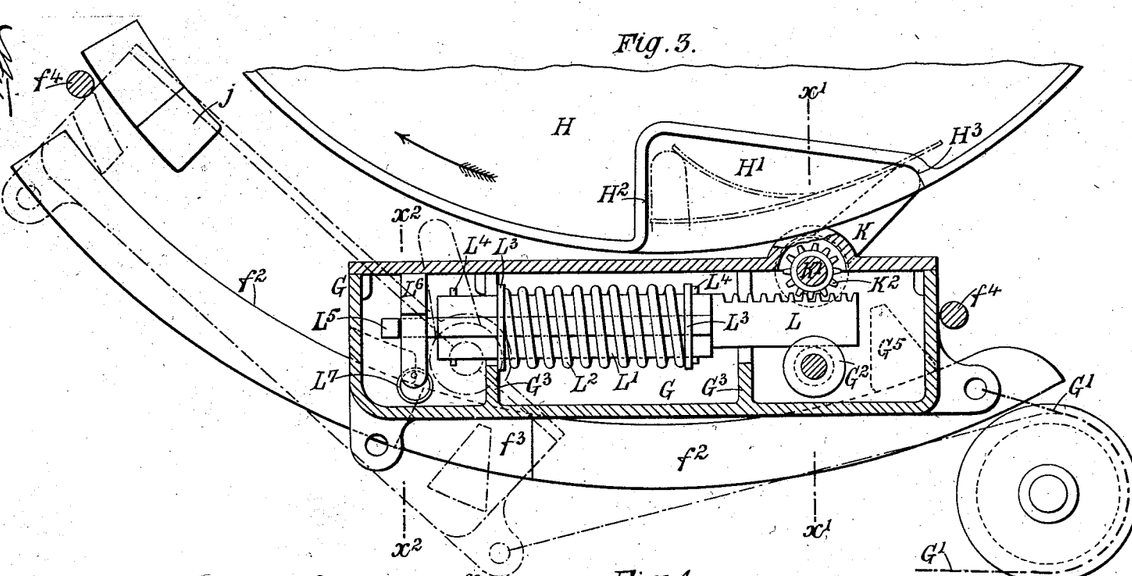
Fig. 3 is a vertical longitudinal section, Fig. 4 a plan, partly in horizontal section, and Fig. 5 a transverse section on the line $x'\ x'$, Fig. 3, all drawn to an enlarged scale, showing the pawl-carrier and adjacent parts.
Figure 4:
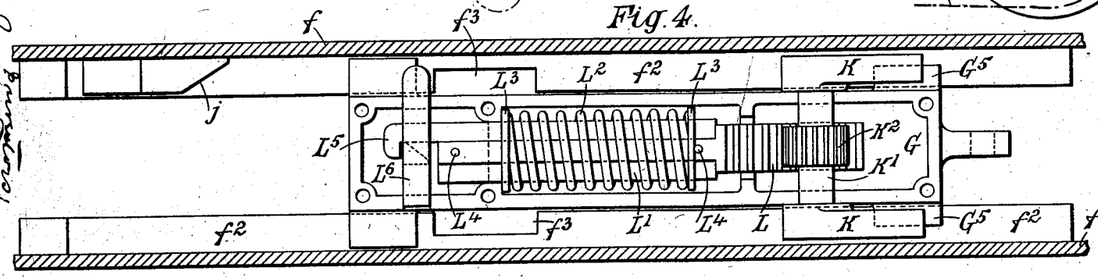
Figure 5:
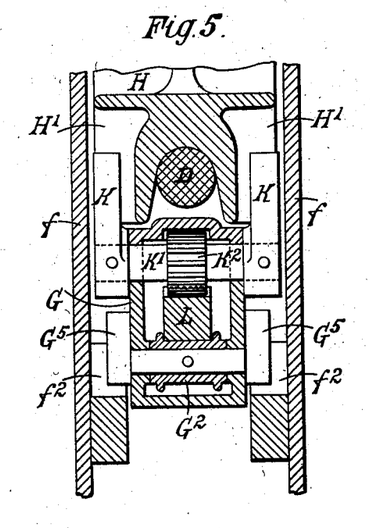
Figure 6:
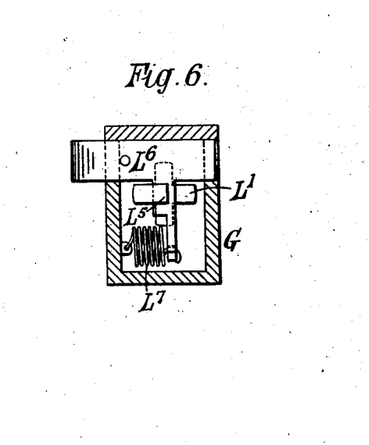
Fig. 6 is a transverse section through the pawl-carrier on the line $x^2 x^2$, Fig. 3.

In the rotation of the sheave H while the fall-block $f$ and bucket F are being raised, with the load, into the position shown in Figs. 1 and 2 the pawls K are merely depressed by the shoulders H³ of the said sheave. When, however, the load is lowered and the sheave H rotates in the direction indicated by the arrow in Fig. 1, the shoulder H² which first strikes the pawls K will cock the same or turn them so that they point to the right. Therefore when the fall-block $f$ is again raised and the sheave H rotated in the direction indicated by the arrow in Fig. 3 the shoulder H³ which first comes in contact with the pawls K will engage therewith, as shown in Fig. 3, and move the carrier G toward the left along the guideway or race $f^2$ into the position indicated by dotted lines in Fig. 3. In this manner the cord or chain G' will be hauled in, so as to disengage the latch and permit the dumping of the load by the tilting of the bucket F about its trunnions F³.

Figure 7:
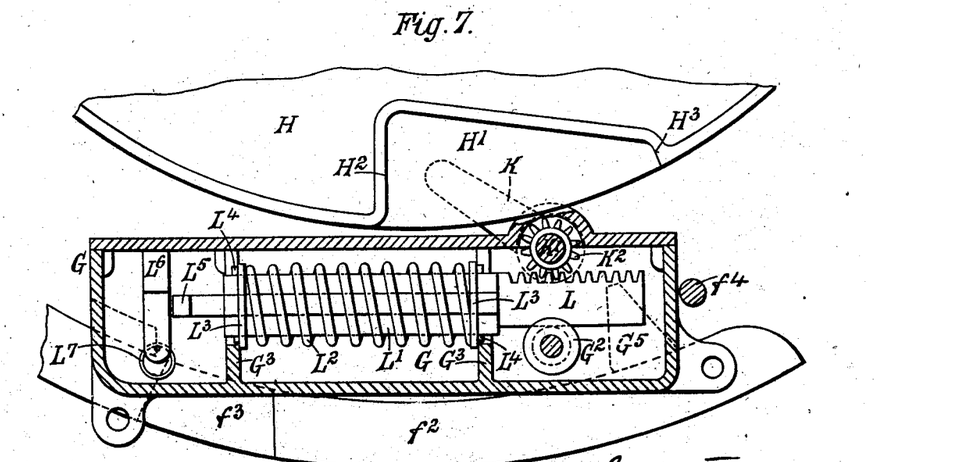
Fig. 7 is a similar view to Fig. 3, some of the moving parts being shown in a different position.

In order that the pawl K shall when free always return to and remain in the inoperative position, as shown in Fig. 7, until cocked or turned over to the right by the shoulder H², its pivot-pin K' is provided with a pinion K², geared with a rack L on a rod or bar L', which is adapted to slide longitudinally within the carrier G on a flanged guide-roller G² and guides G³ and to be forced by a stopped spring L² to return to and remain in a predetermined position when free to do so. This spiral spring L² is placed upon the bar L' between washers L³, mounted loosely thereon, but having their motion limited by means of pins or other projections L⁴ on the rod L'. When the pawls K are in the position shown in Figs. 1 and 7, the washers L³ are pressed against the guides G³, respectively. In the cocking of the pawls K the pinion K² moves the bar L' to the left, as shown in Fig. 3, in which position it is locked by means of a hook L⁵ at its extremity engaging with a latch L⁶, which is movable in transverse slots in the carrier G and is acted upon by a spring L⁷. The pawl is thus prevented from turning back to the left in the recess H' after having been cocked. Instead of locking the pawl in this manner we sometimes effect the same purpose by providing a flat spring which extends across the recess H', as indicated by dotted lines in Fig. 3. This flat spring is strong enough to prevent the pawls being turned by the action of the spiral spring L², but yields to allow the pawl to turn when being cocked by the shoulder H². When the carrier G has been moved to the end of its travel by the sheave H, as indicated by dotted lines in Fig. 3, an extension of the latch L⁶ comes against an inclined projection $j$ on the frame $f$ of the fall-block, whereby the said latch L⁶ is pushed in and the rod L' released. At this moment the trailing projections G⁵ on the carrier G, which sustain said carrier in the way $f^2$, fall through slots or recesses $f^3$ in the guideway $f^2$, so as to withdraw the pawls from the sheave H and allow the said pawls to be returned to their original position by the reaction of the spring L². Stops $f^4$ are provided for limiting the movement of the pawl-carrier G.

In the form of latch shown in Figs. 1, 2, and 8 the latching-bolt J is pivotally mounted in the lower part of a vertically-movable block J', and when the latch is in engagement with the notched bar F⁴ on the bucket F the said block J' rests on the upper surface of a fixed block J², another vertically-movable block J³ resting on the block J' and having pivoted to it a hooked bent lever J⁴, which extends through a slot in the block J'. When the block J³, to which the cord or chain G' is attached, is raised by the movement of the carrier G, the hook of the lever J⁴ engages with a shoulder J⁶ on the block J', which is also raised, thus forcibly withdrawing the latching-bolt J and releasing the bucket, as shown in Fig. 8, the arm J then resting against a stop J⁷ in the block J', leaving no part projecting beyond the edge of the bail F' to interfere with the replacing of the bail on the trunnion F³. When the bail F' has been hooked onto the trunnions of a full bucket, the lever J⁴ is pressed in by hand, thereby unhooking the block S', which falls back onto the fixed block J², and then on raising the bail to the vertical position the latch J engages the notch F⁴ of the bucket. To reset the carrier G ready for the next operation, it may be raised out of the recesses $f^3$ by hand by means of a lever M, pivoted at M' to the fall-block frame $f$ at the moment of commencing to hoist the bucket, or, if desired, it may be left in its inoperative position until the load is raised, in which case it will be automatically raised out of the said recesses by contact of the lever M with the guide-frame or bell $p$ of the traveler. The block J³ then falls again into the position shown in Fig. 2, ready for operation, as before described. In this position the latch J is locked by the hook of the lever J⁴, which fills up the space in which the projection J⁵ turns for unlatching, and the hook itself is likewise locked in a position which compels it to engage with the shoulder J⁶. The block J³ in falling rearms the pawl-carrier G by drawing it to the right.

When the releasing or tipping mechanism is left out of gear until the load is raised far enough to permit the shifting lever M to be automatically actuated, as above described, extra safety is insured in the working of the apparatus, because the load cannot be accidentally released during the raising of the same; but after it has been raised to a predetermined height it can be lowered to any desired position and then released. It is not, however, absolutely necessary to provide this extra safeguard.

Figure 9:
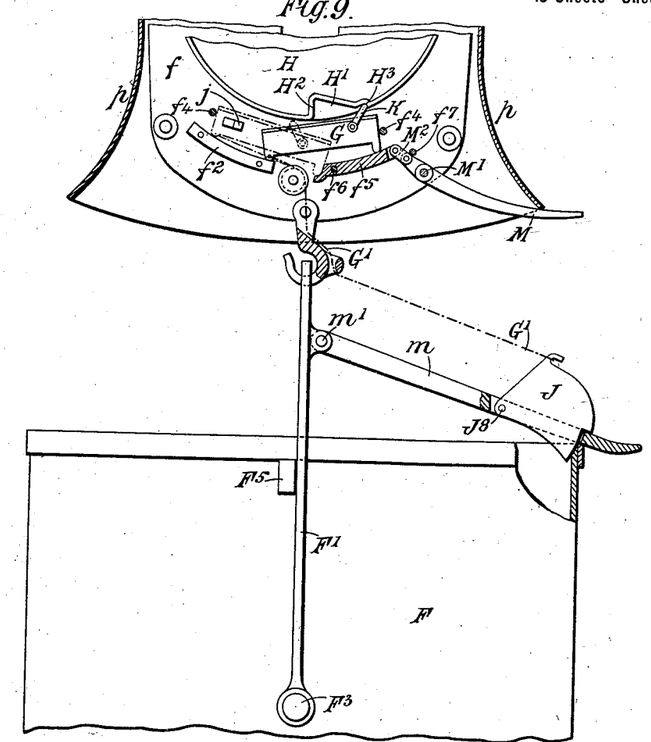
Fig. 9 is a side elevation, partly in vertical section, illustrating another form or modification of our improved apparatus.
Figure 10:
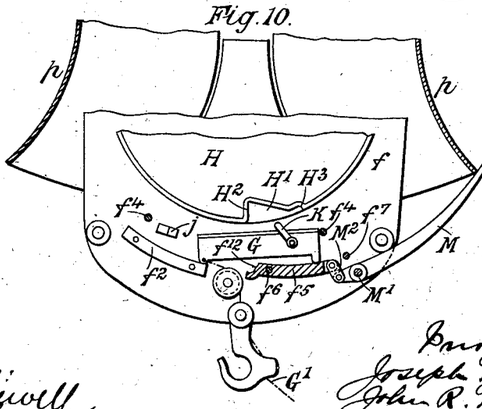
Fig. 10 is a similar view, the parts being shown in a different position and some of the parts being removed.

In the modification of our invention shown in Figs. 9 and 10 the guideway or race for the pawl-carrier G consists of a fixed part $f^2$ and a movable part $f^5$, pivoted at $f^6$ to the fall-block frame $f$ and having its other end connected, by means of a link $M^2$, to a shifting lever M, pivoted at M' to the said frame. When the outer end of the lever M is raised, as shown in Fig. 10, the movable part $f^5$ of the guideway is lowered and the pawl K thus withdrawn from the sheave H. When in the lifting of the load the lever M is depressed into the position shown in Fig. 9, as by the guide-frame or bell $p$ on the traveler A, the movable piece $f^5$ is raised to the position shown in this figure, so that the pawls K can be acted upon by the shoulders $H^2$ $H^3$ on the sheave H and is locked in this position by the toggle-joint formed by the short arm of the lever M and the link $M^2$, further downward motion of the said lever being prevented by a stop $f^7$. When the lever M is again pushed up and the movable part of the race $f^5$ brought to the position shown in Fig. 10, the shoulder $f^{12}$ has moved into a position relative to the direction of the pull of the cord G', which leaves the carrier free to slip off the shoulder and return to the position shown in Fig. 10, ready for further operation.

The latch J (shown in Fig. 9) is pivoted at $J^8$ to an arm $m$, pivoted at $m'$ to the bail F'. The motion of the bucket F about its trunnions $F^3$ is limited in one direction by means of a stop $F^5$, while the tipping of the said bucket by gravity is controlled by the latch J, which rises about its pivot $J^8$ to permit the edge of the bucket to pass under it and which is connected to the releasing chain or cord G', so that it can be thereby turned about its pivot to disengage it from the bucket and permit the dumping of the load.

Figure 11:
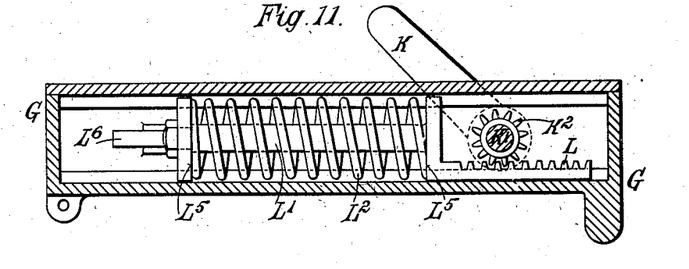
Fig. 11 is a vertical longitudinal central section, and Fig. 12 a plan, partly in horizontal section, showing a modified arrangement of the pawl-carrier.
Figure 12:
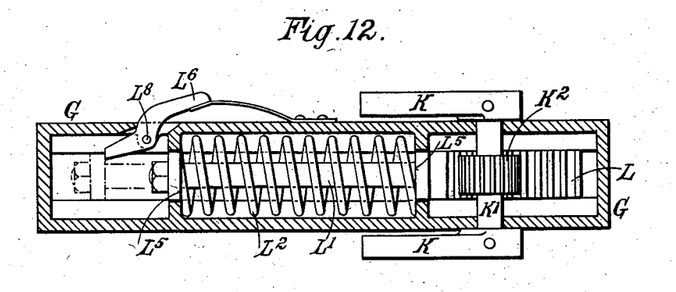

In Figs. 11 and 12 we have shown a modification of the pawl-carrier in which the bar L' is adapted to be locked in position when the pawls are cocked by means of a spring detent or latch $L^6$, which is pivoted at $L^8$ to the frame of the pawl-carrier G, as shown, and which engages with a shoulder $L^5$ on the bar L'. In the movement of the pawl-carrier to the left this latch $L^6$ is disengaged from the said shoulder by an inclined projection $j$ on the frame $f$ for the purpose of releasing the rack L and allowing the pawls K to return to their normal position.

Figures 13, 14:
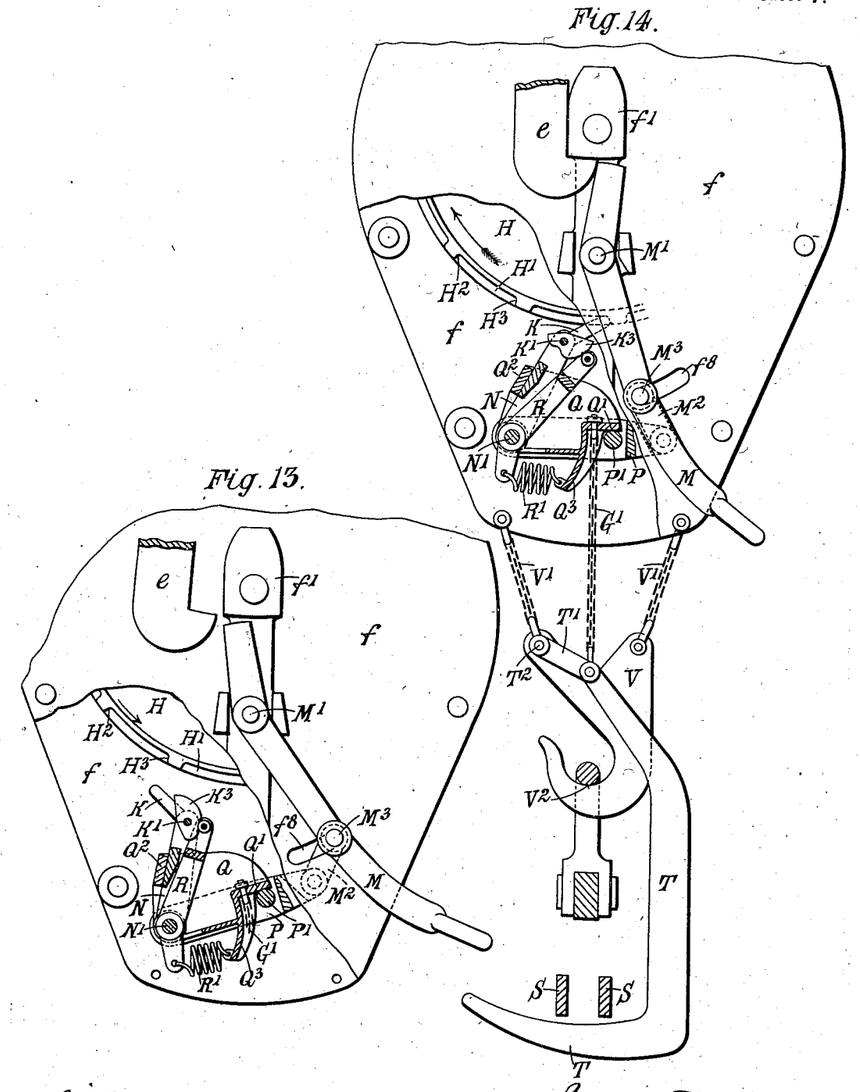
Fig. 13 is a side elevation, partly in vertical section, showing another modification of our invention.
Fig. 14 is a similar view, the parts being shown in a different position.

In the arrangement shown in Figs. 13 to 16 the pivot-pin K' of the pawls K is mounted in the end of a lever N, pivoted at N' to a lever P, which turns about a pin P', fixed in the fall-block frame $f$. The lever P is coupled by means of a link $M^2$ to a lever M, pivoted at M' to the frame $f$ of the fall-block, the motion of the lever M being limited by the pin $M^3$, which connects the lever M and link $M^2$ and which works in slots $f^8$ in the fall-block frame $f$. On the pin N' is also pivoted a bell-crank lever Q, to the arm Q' of which the releasing cord or chain G' is attached. The said arm Q' bears against the fixed pin P', as shown in Figs. 13 and 14, and another arm $Q^2$ of the said bell-crank lever Q bears against the lever N and serves as a stop for the latter. For the purpose of holding the pawls K in their free or normal position and returning them to that position when required we also mount on the pin N' a third lever R, which is pressed by its spring R' against a cam $K^3$, fixed on the pivot-pin K' of the said pawls, and is adapted to enter a notch or depression in the said cam, as shown in Fig. 13. The said spring R' is connected at one end to the lever R and at its other end to the curved part $Q^3$ of the bell-crank lever Q, and therefore serves also to hold the lever N against the arm or stop $Q^2$.

The releasing mechanism is shown in Fig. 13 out of action, the lever M having been moved by hand so as to turn the lever P about its pivot P', and thus move the pawls K away from the sheave H. When the fall-block $f$, with the bucket attached, is lifted until the said block enters the guide-frame or bell of the traveler, the action of the load-suspending hook or hooks $e$ turns the levers M and P about their respective pivots, so as to bring the pawls K within reach of the shoulders $H^2$ $H^3$ of the sheave H. When the fall-block is lowered, the sheave H, revolving in the direction indicated by the arrow in Fig. 13, cocks the pawls K, turning the same over into the position shown in Fig. 14. In this movement the lever or pawl-carrier N and the spring-arm R are depressed, and then when the projection on the sheave has passed farther to the right the parts assume the position shown in Fig. 14, which is the cocked or driving position. The said levers M and P remain in the position indicated in Fig. 14, because the toggle-joint formed by the lever M and link $M^2$ is on or past the dead-center, and therefore resists the upward pressure on the right-hand end of the lever P due to the weight of the bell-crank lever Q and its adjuncts. On again commencing to hoist up the fall-block the sheave H, revolving in the direction indicated by the arrow in Fig. 14, turns the pawl-carrier N, and with it the bell-crank lever Q, into the position shown in Fig. 16, the chain G' being thereby drawn up and the load dumped, after which the pawls K by the action of the spring-lever R upon the cam $K^3$ are caused to fly back to their normal position, and the bell-crank lever falls back to the position shown in Fig. 14, when it is again ready for action.

To put the gear out of action, it is necessary to move the exterior arm of the lever M to the right, when the parts return to the position shown in Fig. 13.

The lever M may, if desired, be so arranged that it will be automatically operated by contact with an abutment or other device projecting from the overhead track or with the traveler or with a weight suspended from the gib of a crane.

Figure 17:
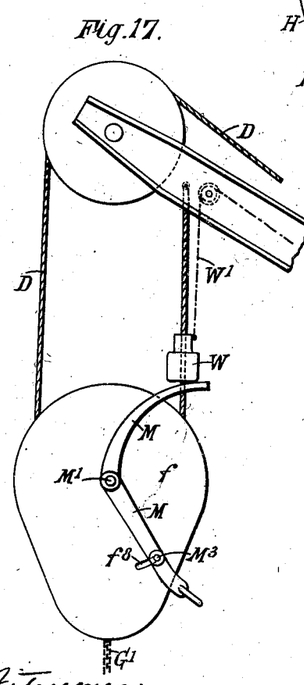
Fig. 17 is a side elevation illustrating one mode of applying our invention to a gib-crane.

For use with an ordinary crane the upper part of the lever M may be extended to a position where it will come into contact with a heavy weight W, Fig. 17, which is suspended from the gib of the crane and which will turn the said lever about its pivot when the load is raised. In the arrangement shown in Fig. 17 the height of the weight W above the ground can be adjusted by means of a cord or chain W', passed over a suitable guide-pulley. Other suitable means can also be employed, if desired, for automatically setting the releasing mechanism in the raising of the load. It is evident, however, that if this extra safeguard is deemed unnecessary the oscillating pawl-carrier N and the bell-crank lever Q can be pivoted at N' to the fall-block frame $f$.

Figures 15, 16:
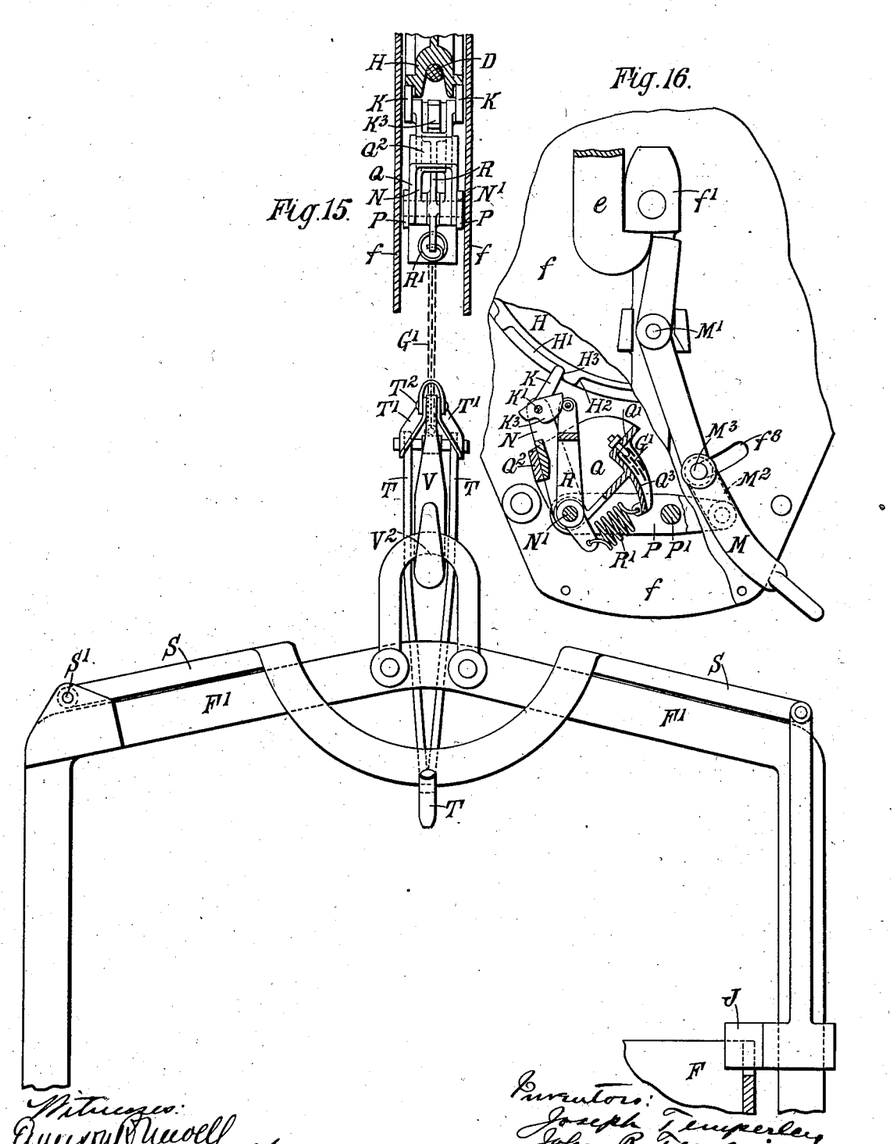
Fig. 15 is an end elevation, partly in transverse section, of the apparatus shown in Fig. 14, illustrating also the connection with the bucket-latch.
Fig. 16 is a similar view to Fig. 13, the parts being shown in a different position.

The latch J in the arrangement shown in Figs. 14 and 15 is suspended from a lever S, pivoted at S' to the bail F'. The lever S and latch J are raised to release the bucket by a hook T, suspended from the chain G' and pivoted to the free end of arms T', which in turn are pivoted at $T^2$ to a load-hook V, attached by chains V' to the fall-block $f$. The said arms T' keep the hook T in the plane of the load-hook V. The said hook T engages with a curved portion of the lever S, which is approximately concentric with the point $V^2$, so that the swinging of the bucket will not alter the distance between the hook T and the said lever S. The hook T is similarly curved at its lower end for the same purpose.

When the chain G' is hauled in by the pawl-carrier, it raises the hook T, which in turn raises the latch J and allows the bucket to tilt.

Figures 23, 24:
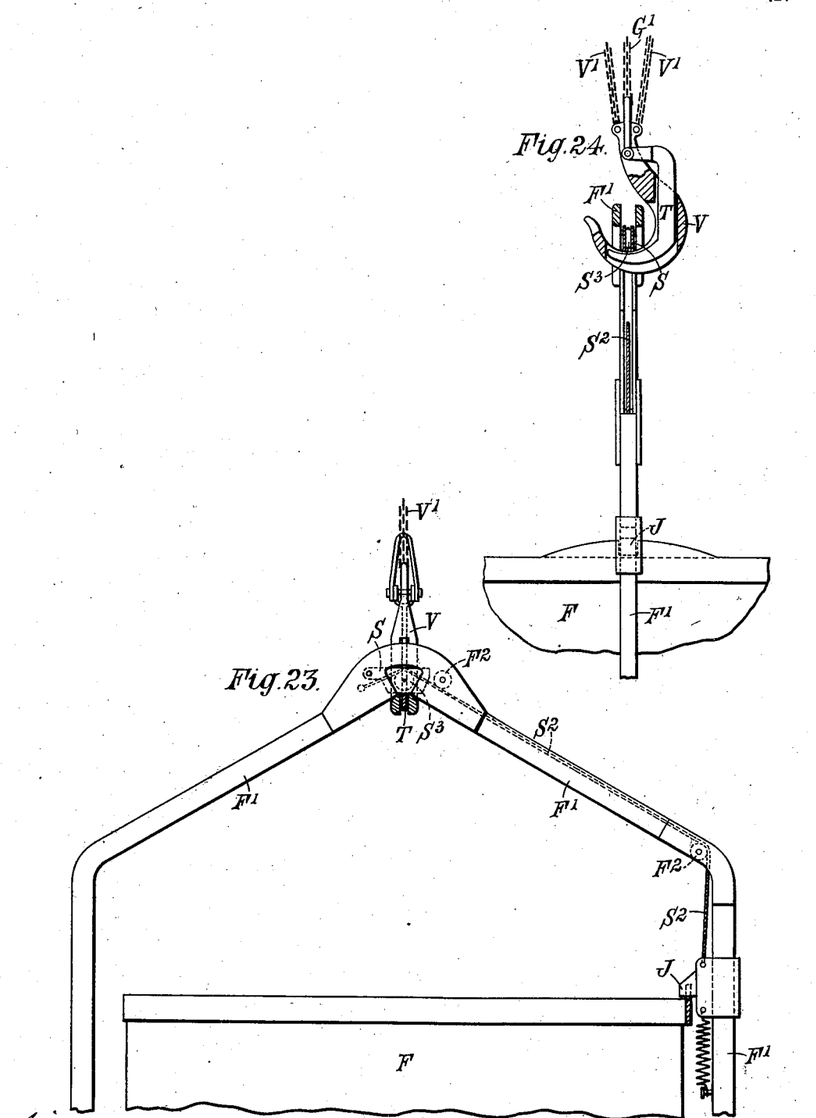

The hook T instead of working below the load-hook V may be arranged to work above the same, as shown in Figs. 23 and 24. The lever S in these figures is connected to the spring-latch J by means of a cord or chain $S^2$, passing around suitable pulleys $F^2$ on the bail F' and over a pulley $S^3$ on the lever S and secured to the said bail, so that when the said hook T is raised it will haul in the cord or chain $S^2$, and thus disengage the said latch.

Figure 18:
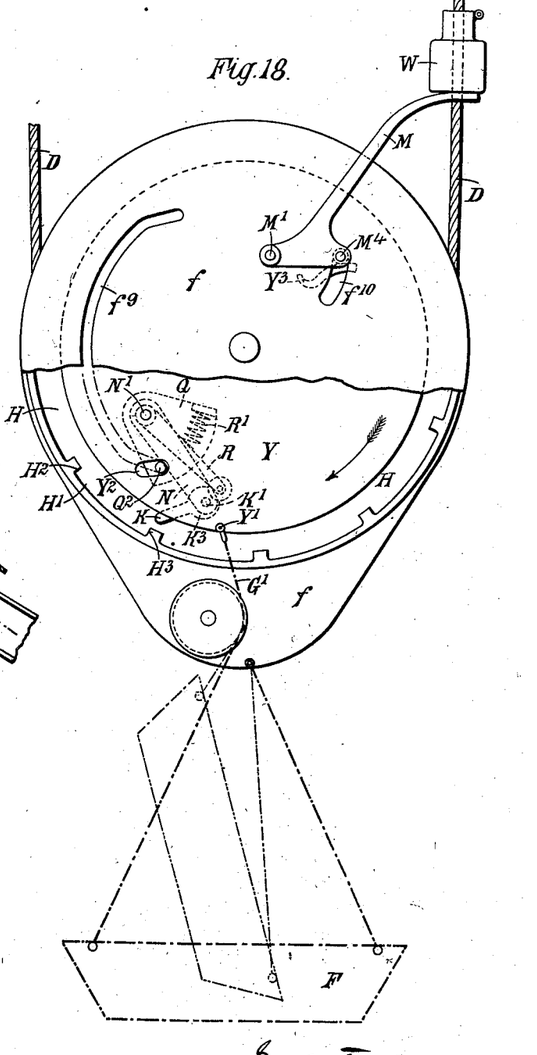
Fig. 18 is a side elevation, partly in vertical section, showing another modification of our said invention.
Figure 19:
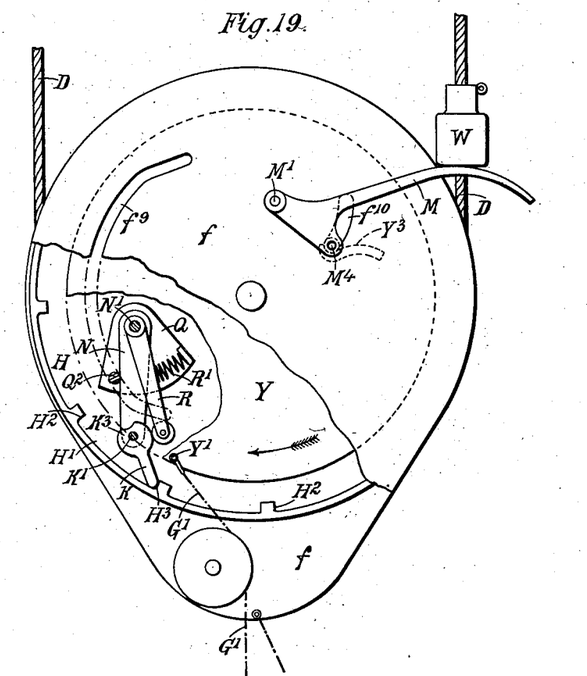
Fig. 19 is a similar view, the parts being shown in a different position.

In the modification of our invention illustrated in Figs. 18 and 19 we employ an auxiliary sheave (or sheaves) Y, to which the releasing or tipping chain G' is attached at Y'. This sheave Y is mounted on the same axis as the sheave H, and the two sheaves are free to revolve independently of each other except when the pawl K is in operative position. In the arrangement shown a lever or pawl-carrier N, a bell-crank lever Q, and a spring-arm R, similar to those described with reference to Figs. 13 to 16, are pivoted at N' to the inner side of the auxiliary sheave Y, and the shoulders $H^2 H^3$ are formed on the interior of a flange on the sheave H. A stop-pin $Q^2$ in the bell-crank lever Q extends through a slot $Y^2$ in the sheave Y into a curved race or cam-groove $f^9$ in the fall-block frame $f$. When this stop-pin is at either extremity of the said cam-groove $f^9$, the pawl K is out of reach of the shoulders $H^2 H^3$ on the sheave H. To bring the said pawl into the path of these shoulders when the parts are in the position shown in Fig. 18, the sheave Y requires to be turned through a small angle in the direction indicated by the arrow in Fig. 18, so as to bring the pin $Q^2$ into the circumferential part of the said cam-groove. This is effected in the lifting of the load by a lever M, pivoted at M' to the fall-block frame $f$ and having a pin $M^4$ projecting from it through a slot $f^{10}$ in the said frame and adapted to press against a cam $Y^3$ on the sheave Y, the weight W or any other suitable device provided for the purpose turning the lever M from the position shown in Fig. 18 to that shown in Fig. 19. The curved upper face of the cam $Y^3$ is so shaped that it will retain the lever M in the position shown in Fig. 19, as is done by the toggle-joints in the arrangements hereinbefore described. In the lowering of the load the cocking of the pawl K will be effected by the sheave H, and then by again hauling in the lifting-rope D the sheave Y can be turned through the medium of the sheave H and pawl K in the direction indicated by the arrows in Figs. 18 and 19, so as to wind the chain G' more or less upon the said sheave Y, and thus effect the tipping of the bucket or, if desired, the disengagement of the bucket-latch. On raising the lever M by hand the weight of the bucket will move the sheave Y back to its original position and throw the pawl K out of action. By this form of construction we can provide for the hauling in of a considerable length of the cord or chain G', and so, if desired, bodily tip the bucket or tray, as indicated by dotted lines in Fig. 18.

Figure 20:
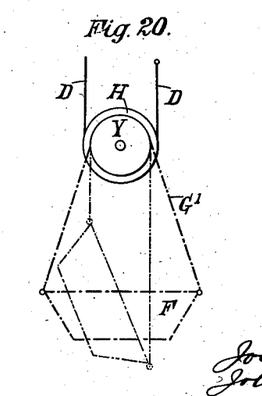

We sometimes pass the cord or chain G' over the auxiliary sheave Y and attach both ends to the bucket or tray, as shown in Fig. 20, so that as one end of the said cord or chain is hauled in the other is paid out, and the bucket or tray is thus tilted or tipped so as to dump the load.

Figures 21, 22:
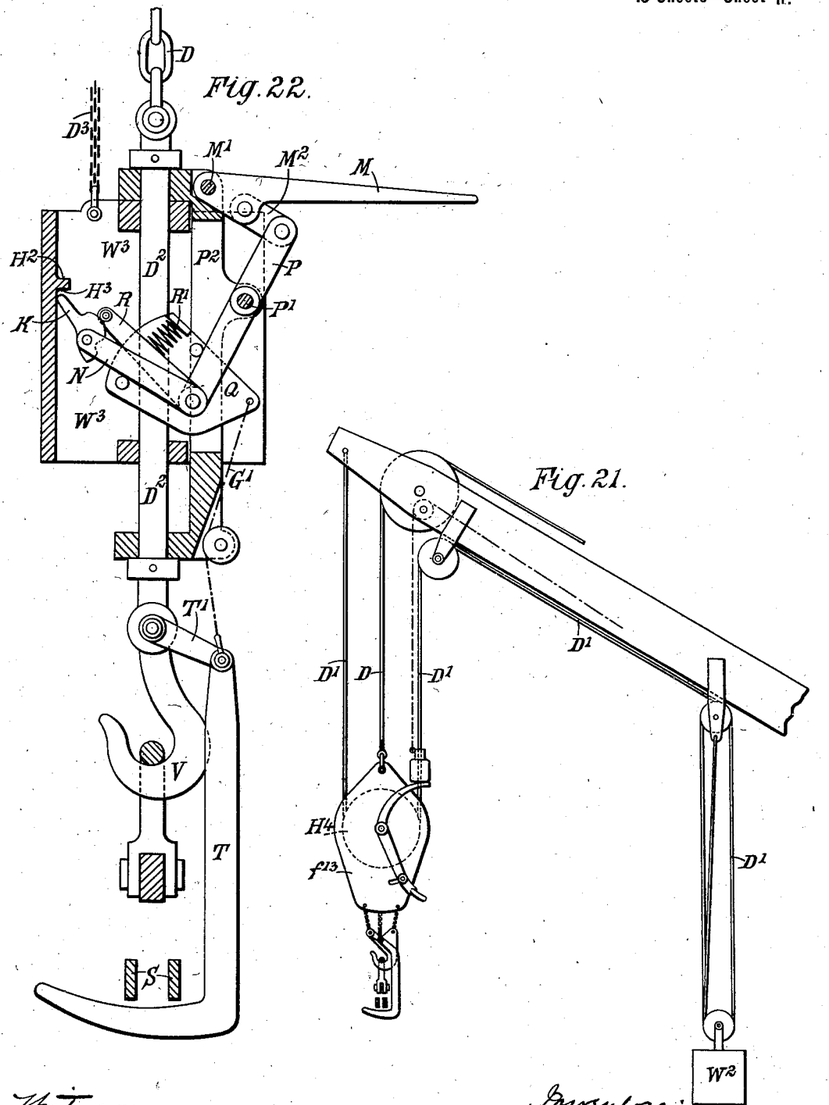

We do not confine ourselves to the application of our invention to a hoisting-machine provided with a multiple-purchase lifting-tackle. It is evident that when the load is raised directly by the lifting-rope D an idle rope D', Fig. 21, passing over a sheave $H^4$ in a fall-block $f^{13}$, suspended from the lifting-rope D and kept taut by a counterweight $W^2$, can be made to effect the same purpose. We can also in some cases dispense with the use of a sheave for actuating the releasing or tipping mechanism. For instance, in Fig. 22 we have shown an arrangement in which the reversible pawl K is actuated by a weight $W^3$, having cocking and operating shoulders $H^2 H^3$ and sliding vertically through a sufficient space upon a bar $D^2$, attached to the lifting rope or chain D, so as to answer the same purpose as the sheave above described. The weight $W^3$ is suspended from a chain $D^3$, which passes over pulleys on the crane-gib or the like, and is provided with a counterweight that just balances the weight of W³. The pawl-carrier N is mounted on a lever P, pivoted at P' to a frame P², which is restrained from vertical motion relatively to the lifting-rope D and rod D². In the position shown the load has been lowered and the pawl cocked. On again raising the load the pawl-carrier N rises relatively to the weight W³, and the pawl K engaging the shoulder H³ the releasing or tipping mechanism is operated as in the other cases above described.

Figures 25, 26:
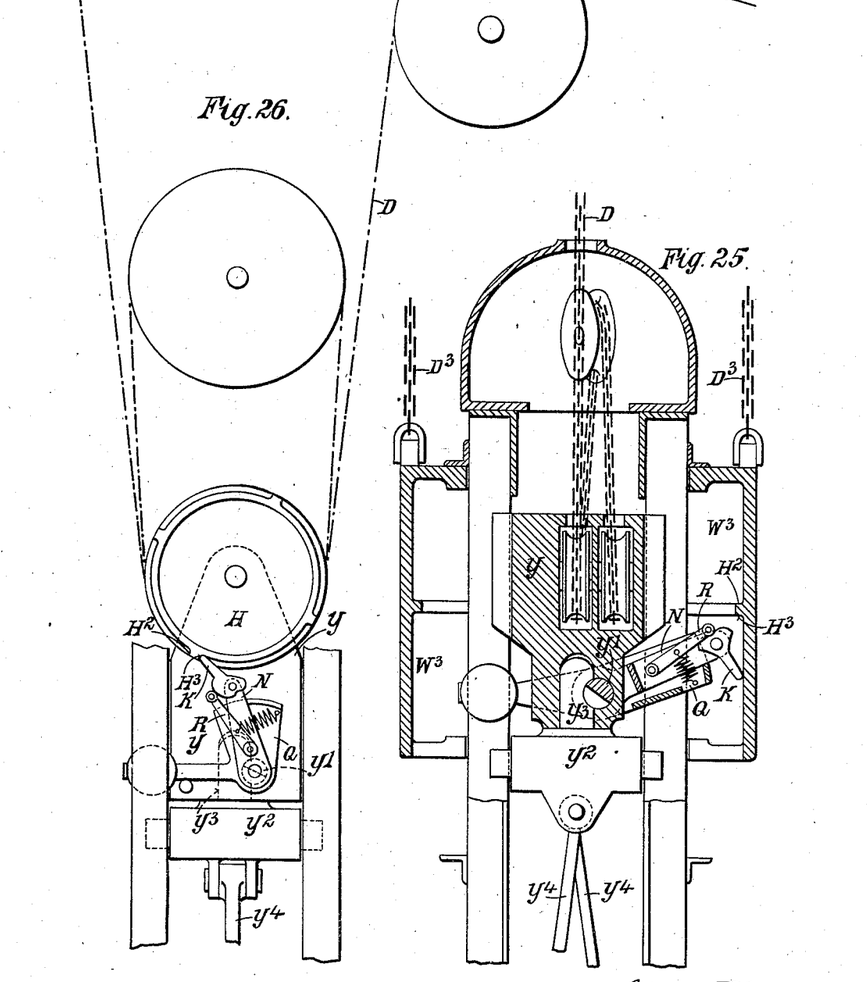
Figs. 25 and 26 are sectional elevations illustrating the application of our invention to different forms of dumping-grabs.

Fig. 25 shows the application of our invention to a grab that is lifted, lowered, and operated by a single rope or chain D. The grab shown, with the exception of the unlocking device, is similar to that known as "Hone's patent grab" and need not be described further than to state that when the grab is closed the opening of the same is prevented by means of the notched pin $y'$, carried by the sliding block $y$, engaging in a notch in the side of the stem $y^3$ of the sliding cross-head $y^2$, which is connected by the rods or links $y^4$ with the pivoted jaws of the grab. The pin $y'$ is notched, so that when it is rotated through an angle of, say, sixty degrees the cross-head $y^2$ is free to fall. We mount our pawl-carrier N on this pin $y'$ and operate it by a weight W³, as in the arrangement shown in Fig. 22. The pawl-lever Q is extended to the left and counterbalanced to keep it in or return it to its normal position.

Fig. 26 shows the application of our said invention to a grab similar to that shown in Fig. 25, except that the lifting-rope D has a double purchase. In this case our pawl-carrier N is mounted on the same pin $y'$, but is operated by the sheave H in the manner hereinbefore described.

It is obvious that the details of construction of our improved apparatus can be somewhat further modified, if desired, without departing from the nature of our said invention.

What we claim is—

1. In an apparatus for dumping or releasing loads suspended from a lifting-rope, the combination, with the lifting-rope, of a retaining device suspended therefrom for temporarily preventing the dumping or release of the suspended load, a movable pawl-carrier having a reversible pawl and adapted when moved in one direction to disengage said retaining device, a support for said pawl-carrier suspended from said lifting-rope, and a shouldered member also suspended from said lifting-rope whereby, in the paying out and hauling in of said lifting-rope, said reversible pawl is first cocked and said pawl-carrier then moved through the medium of the said reversible pawl to bring about the dumping or release of the suspended load.

2. In an apparatus for dumping or releasing loads suspended from a lifting-rope, the combination, with said lifting-rope, of a retaining device suspended therefrom for temporarily preventing the dumping or release of the load, a frame suspended from said lifting-rope, a pawl-carrier with a reversible pawl mounted in said frame and adapted, when moved in one direction, to disengage said retaining device, and a shouldered member also suspended from said lifting-rope and movable relatively to said frame, whereby, in the paying out and hauling in of said rope, said reversible pawl is first cocked and said pawl-carrier then moved through the medium of the said reversible pawl to bring about the dumping or release of the suspended load.

3. In an apparatus for dumping or releasing loads suspended from a lifting-rope, the combination, with the lifting-rope, of a retaining device suspended therefrom for temporarily preventing the dumping or release of the suspended load, a movable pawl-carrier having a reversible pawl and adapted, when moved in one direction, to disengage said retaining device, a support for said pawl-carrier suspended from said lifting-rope, and a shouldered member also suspended from said lifting-rope whereby, in the paying out and hauling in of said lifting-rope, said reversible pawl is first cocked and said pawl-carrier then moved through the medium of the said reversible pawl to bring about the dumping or release of the suspended load, a pivoted lever whereby said reversible pawl and pawl-carrier are thrown out of gear with said shouldered member after the load is dumped or released, and means to actuate said lever when a fresh load is raised to a predetermined height and thus throw said reversible pawl and pawl-carrier into gear, for the purposes above specified.

4. The combination of a lifting or hoisting tackle comprising a lifting rope or chain, a frame suspended therefrom, a shouldered member also suspended therefrom and movable relatively to said frame by both paying out and hauling in of said rope or chain, a retaining device for temporarily preventing the dumping or release of the suspended load, a pawl-carrier with a reversible pawl carried by said frame and adapted to be actuated by said shouldered member, to disengage said retaining device, and means to throw said reversible pawl and pawl-carrier out of gear with said shouldered member after the dumping or release of the load, and to automatically throw it into gear when the load is raised or transported to a predetermined position, for the purposes above specified.

5. The combination of a lifting or hoisting tackle comprising a lifting rope or chain and a pulley-block suspended therefrom and having a shouldered sheave, a retaining device for temporarily preventing the dumping or release of the suspended load, and a pawl-carrier with a reversible pawl carried by the frame of said pulley-block and adapted to be actuated by the shouldered sheave thereof to disengage said retaining device, substantially as, and for the purposes above specified.

6. The combination, with a lifting or hoisting tackle, of a latching device, a pawl-carrier connected therewith and having a reversible pawl, a support for said pawl-carrier suspended from the lifting rope or chain, a shouldered member also suspended from said rope or chain and movable relatively to said support, and adapted to actuate said pawl-carrier to disengage said latching device, for the purposes above specified.

7. The combination, with a lifting or hoisting tackle, of load-releasing mechanism comprising a reciprocating or oscillating carrier arranged in a frame suspended from the lifting rope or chain and a reversible pawl pivoted to said carrier, a guideway or race for said carrier made in two parts one of which is movable relatively to the other, and a lever for raising said movable part of the guideway into its operative position and lowering it therefrom for the purposes above specified.

8. The combination, with a lifting or hoisting tackle and a frame suspended from the lifting rope or chain thereof, of load-releasing mechanism comprising a reciprocating or oscillating carrier arranged in said frame and a reversible pawl pivoted to said carrier, means, substantially such as are hereinbefore described, for holding said reversible pawl in and returning it to its inoperative position, and an operating device for said mechanism also suspended from said rope or chain, for the purposes above specified.

9. The combination, with a lifting or hoisting tackle and a frame suspended from the lifting rope or chain thereof, of load-releasing mechanism comprising a reciprocating or oscillating carrier arranged in said frame and a reversible pawl pivoted to said carrier, means, substantially such as are hereinbefore described, for holding said reversible pawl in and returning it to its inoperative position, and for locking said reversible pawl in its cocked position and unlocking it after the release or dumping of the load, and an operating device for said mechanism also suspended from said rope or chain, for the purposes above specified.

10. The combination, with a lifting or hoisting tackle, of a frame suspended from the lifting-rope, a pawl-carrier with a reversible pawl mounted in said frame, a load-releasing cord or chain connected with said pawl-carrier, and a shouldered member also suspended from said lifting-rope and movable relatively to said frame, whereby in the paying out and hauling in of said lifting-rope, said reversible pawl is first cocked and said pawl-carrier then actuated through the medium of the said reversible pawl to haul in said releasing cord or chain and thus bring about the dumping or release of the load.

11. The combination, with a lifting or hoisting tackle, of load-releasing mechanism, a reversible pawl for actuating said load-releasing mechanism, means for cocking or reversing said pawl during lowering of the load, and means for connecting said cocked or reversed pawl with said load-releasing mechanism, substantially as, and for the purposes, hereinbefore described.

In testimony whereof we have hereunto set our hands in presence of two subscribing witnesses.

JOSEPH TEMPERLEY.
JOHN RIDLEY TEMPERLEY.

Witnesses:
C. WILSON,
J. E. BOVEY.